United States Patent [19]
Prakash

[11] Patent Number: 5,498,945
[45] Date of Patent: Mar. 12, 1996

[54] PEAK-TORQUE-PER-AMPERE (PTPA) CONTROL METHOD FOR AN INDUCTION MOTOR

[75] Inventor: Rajiva Prakash, Westland, Mich.

[73] Assignee: Ford Motor Company, Dearborn, Mich.

[21] Appl. No.: 225,275

[22] Filed: Apr. 8, 1994

[51] Int. Cl.[6] .................................................. H02P 5/40
[52] U.S. Cl. ............................................. 318/807; 318/809
[58] Field of Search ................................... 318/606–610, 318/798–802, 804, 807–811

[56] References Cited

U.S. PATENT DOCUMENTS

| | | |
|---|---|---|
| 3,851,234 | 11/1974 | Hoffman et al. . |
| 4,777,422 | 10/1988 | Slicker et al. . |
| 4,780,658 | 10/1988 | Koyama . |
| 4,808,903 | 2/1989 | Matsui et al. . |
| 4,967,135 | 10/1990 | Ashikaga et al. . |
| 4,968,925 | 11/1990 | De Doncker . |
| 5,027,048 | 6/1991 | Masrur et al. . |
| 5,150,029 | 9/1992 | Watanabe et al. . |
| 5,166,593 | 11/1992 | De Doncker et al. . |
| 5,168,204 | 12/1992 | Schauder . |
| 5,194,797 | 3/1993 | Kahkipuro . |
| 5,365,158 | 11/1994 | Tanaka et al. ................. 318/806 |

*Primary Examiner*—Brian Sircus
*Attorney, Agent, or Firm*—Mark S. Sparschu; Roger L. May

[57] ABSTRACT

In a field-oriented control method and apparatus for an induction motor, a desired quadrature-axis current $i_q{}^*$ and a desired direct-axis current $i_d{}^*$ are chosen. The desired quadrature-axis current $i_q{}^*$ and desired direct-axis current $i_d{}^*$ are related such that peak torque is produced by the motor per ampere of electric current flowing in the motor. The peak-torque-per-ampere condition implies that the motor is operating at high efficiency.

Also, in a field oriented control method and apparatus for an induction motor, a desired quadrature-axis current $i_q{}^*$ and a desired rotor flux $\lambda_r{}^*$ are chosen. The desired quadrature-axis current $i_q{}^*$ and desired rotor flux $\lambda_r{}^*$ are related such that peak torque is produced by the motor per ampere of electric current flowing in the motor.

14 Claims, 3 Drawing Sheets

5,498,945

PEAK-TORQUE-PER-AMPERE (PTPA) CONTROL METHOD FOR AN INDUCTION MOTOR

BACKGROUND OF THE INVENTION

1. Field of the Invention

The present invention relates to induction motor control generally, and more particularly to "field-oriented" or "vector" control of induction motors.

2. Description of the Related Art

Control of induction motors can be performed by "field-oriented" or "vector" control. Several examples of field-oriented-control schemes exist. Included in those examples are U.S. Pat. No. 4,808,903, issued to Matsui et al.; U.S. Pat. No. 5,027,048, issued to Masrur et al.; and U.S. Pat. No. 4,967,135, issued to Ashikaga et al; U.S. Pat. No. 5,166,593, issued to De Doncker et al.; and U.S. Pat. No. 5,168,204, issued to Schauder.

Generally, in field-oriented control of an induction motor, the electric currents in the phases of the motor (e.g., three phases in a three-phase motor) are resolved into one "direct-axis" current and one "quadrature-axis" current. The direct and quadrature axes reside in a synchronously-rotating reference frame.

In field-oriented control, rotor flux of the motor is a function of direct-axis current (and independent of quadrature-axis current), while torque produced by the motor is generally a function of both direct-axis and quadrature-axis currents. Rotor flux is a function of only direct-axis current due to selection of the slip speed at which the rotor operates. (Slip speed is defined as the difference in rotational speed between the rotor and the electromagnetic field in the stator of the motor). If the slip speed is properly selected, the motor is said to be "field-oriented" and the rotor flux along the quadrature axis is zero (that is, all of the rotor flux is along the direct axis).

As those knowledgeable in the art of induction motor control realize, effective control of an induction motor is facilitated by applying field-oriented-control techniques.

A field-oriented controller chooses desired direct-axis and quadrature-axis currents such that the motor being controlled operates as desired (e.g., with desired torque or speed). Sometimes, in field-oriented control of an induction motor, the controller will assume that the quadrature-axis and direct-axis currents should be equal. For some operating conditions, this assumption will produce good efficiency of the motor being controlled. The controller will then cause the desired quadrature-axis and direct-axis currents to be transformed into three phase currents. Those three phase currents are the actual physical electric currents applied to the motor.

The assumption made by the controller that the direct-axis current should be equal to the quadrature-axis current is sometimes a good assumption; sometimes, high efficiency is produced. However, where saturation of the core of the motor begins to set in (a fairly common condition), the efficiency resulting from equating quadrature-axis current and direct-axis current begins to decrease.

Another means employed in the prior art to help assure high efficiency of an induction motor is to run the motor and measure the efficiency (i.e., energy produced as a fraction of energy consumed) at which the motor is operating. By trial and error, the direct-axis current is modified such that the efficiency of the motor is a maximum. Although this method may be effective for motors that operate mostly in a few operating conditions, such a trial-and-error approach is not as applicable where motors operate in varying conditions (such as in an electric-powered vehicle, for example).

Therefore, a method to control an induction motor with high efficiency over a wide operating range without requiring a trial-and-error approach would provide advantages over the prior art.

SUMMARY OF THE INVENTION

The present invention provides a method for field-oriented control of an induction motor. The method involves the step of choosing a desired quadrature-axis current $i_q^*$. The method further involves the step of choosing a desired direct-axis current $i_d^*$ where $i_d^*$ is a function of $i_q^*$ and of a magnetizing inductance of the induction motor.

The present invention further provides a second method for field-oriented control of an induction motor. This method involves the step of choosing a desired quadrature axis current $i_q^*$. Additionally the method involves the step of choosing a desired rotor flux $\lambda_r^*$ where $\lambda_r^*$ is a function of $i_q^*$ and of a magnetizing inductance of the induction motor.

The present invention also provides a field-oriented control apparatus for an induction motor. The apparatus includes means for choosing a desired quadrature-axis current $i_q^*$. The apparatus also includes means for choosing a desired direct-axis current $i_d^*$, wherein $i_d^*$ is a function of $i_q^*$ and of a magnetizing inductance of the induction motor.

This invention allows an induction motor to be controlled in a peak-torque-per-ampere (PTPA) condition. This condition implies high efficiency. Furthermore, this invention allows an induction motor to be controlled at high efficiency over a wider operating range than the prior art assumption that direct-axis current should be set equal to quadrature-axis current. Further, the high efficiency is achieved without the requirement of a trial-and-error approach to reach that high efficiency.

DETAILED DESCRIPTION OF THE PREFERRED EMBODIMENTS

1. Glossary of Symbols

The following symbols related to an induction motor appear in the Description which follows:

T=torque produced
$\lambda_r$=rotor flux
$i_q$=quadrature-axis current
$i_d$=direct-axis current
$\omega_s$=slip speed
T*=desired torque
$\lambda_r$*=desired rotor flux
$i_q$*=desired quadrature-axis current
$i_d$*=desired direct-axis current
$\omega_s$=desired slip speed
$L_m$=magnetizing inductance
$L_r$=rotor self-inductance
$L_{lr}$=rotor leakage inductance
$T_r$=rotor time constant
P=number of poles

2. Description

Figure 1:
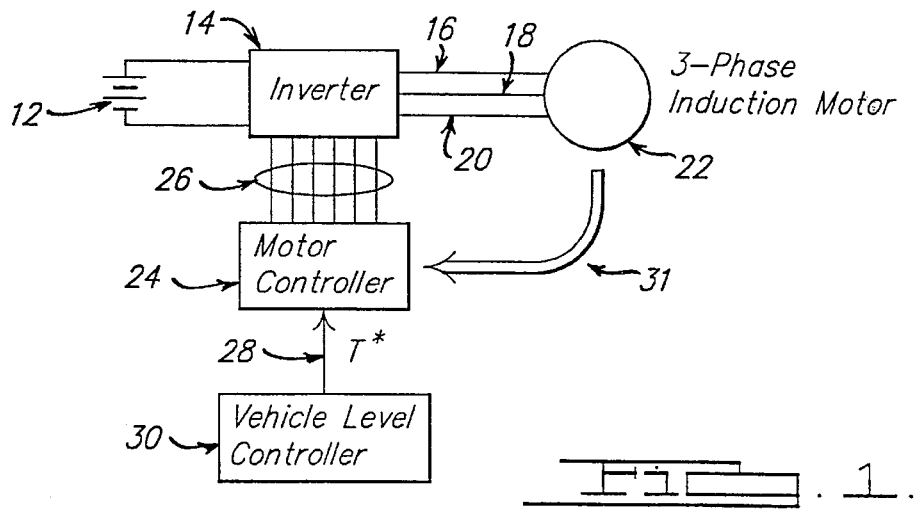
FIG. 1 is a block diagram of an induction motor control system of the present invention.

FIG. 1 generally depicts an induction motor control system used in an electrically-driven vehicle in which at least one of the vehicle's drive wheels is driven by an induction motor 22. A battery 12 provides a DC power source for the system. An inverter 14 has six switching devices such as insulated-gate bipolar transistors (IGBTs) to switch the DC battery voltage to create pulse-width-modulated voltages in the three phases 16, 18, and 20 of induction motor 22. Motor controller 24 controls the switching of the switching devices within inverter 14. Six switching signals 26 are passed from motor controller 24 to inverter 14 to effect this switching. A torque command 28 is issued to motor controller 24 by a vehicle-level controller 30. Vehicle-level controller 30 knows vehicle-level variables such as accelerator pedal position and the like, and therefore knows the amount of torque which induction motor 22 should be commanded to produce.

Feedback signals 31 from induction motor 22 to motor controller 24 include such variables as actual currents in phases 16, 18 and 20 and rotational position or speed of the rotor of motor 22.

Figure 2:
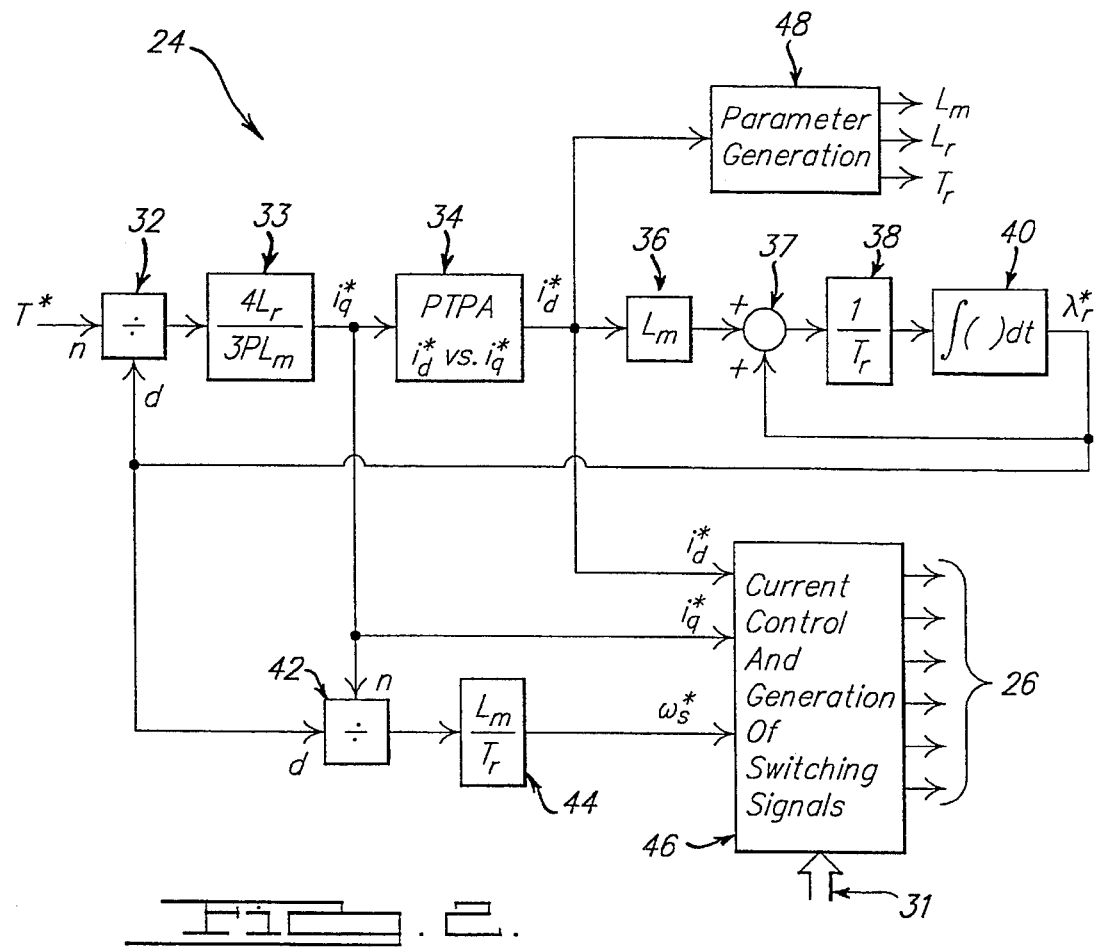
FIG. 2 is a block diagram of one embodiment of motor controller 24 of FIG. 1.

Referring now to FIG. 2, detail of the operations performed by motor controller 24 will be discussed. (It should be noted that the following description of the operations of motor controller 24 are described in the "rotor flux reference frame". Those skilled in the art will recognize throughout the description that equivalent results can be obtained if other reference frames, such as the "stator flux reference frame" or the "air-gap reference frame" are employed). Torque command T* is the numerator in a division operation performed at block 32. The denominator of the division operation performed at block 32 is desired rotor flux $\lambda_r$*. The output of block 32 then is multiplied at block 33 by $$\frac{4}{3} \frac{L_r}{PL_m},$$

where $L_r$ is rotor self-inductance, $L_m$ is magnetizing inductance of motor 22 and P is the number of poles of motor 22. The output of block 33 is desired quadrature axis current $i_q$*. That $i_q$* is the result of the operations at blocks 32 and 33 is due to the fact that for a field-oriented induction motor, the following equation holds true:

$$T = \frac{3P}{4} \frac{L_m}{L_r} i_q \lambda_r, \tag{1}$$

where T is torque and the remainder of the variables have been previously defined. Blocks 32 and 33 obtain $i_q$* per the relationship detailed in Equation (1).

$i_q$* is then used at block 34 to determine desired direct-axis current $i_d$* according to this embodiment of the present invention. Derivation of the relationship between $i_d$* and $i_q$* is as follows. First at steady state (i.e. when rotor flux $\lambda_r$ is not varying over time), the rotor flux of the motor can be expressed by the following formula:

$$\lambda_r = L_m i_d. \tag{2}$$

Further, Equation (2) approximately holds when the motor is operating near steady state. Substituting Equation (2) into Equation (1), we find that:

$$T = \frac{3P}{4} \frac{L_m^2}{L_r} i_q i_d. \tag{3}$$

Recognizing that $i_q$ and $i_d$ are orthogonal, we now define a magnitude of motor current $\hat{I}$ as $$\hat{I} = \sqrt{i_q^2 + i_d^2}. \tag{4}$$

$\hat{I}$ is the peak value of the motor phase currents, which are essentially sinusoidal. Rearranging Equation (4), $$i_q = \sqrt{\hat{I}^2 - i_d^2}. \tag{5}$$

Substituting Equation (5) into Equation (3), we see that:

$$T = \frac{3P}{4} \frac{L_m^2}{L_r} i_d \sqrt{\hat{I}^2 - i_d^2}. \tag{6}$$

The "torque per ampere" of motor 22 is thus:

$$\frac{T}{\hat{I}} = \frac{3P}{4\hat{I}} \frac{L_m^2}{L_r} i_d \sqrt{\hat{I}^2 - i_d^2}. \tag{7}$$

It is recognized in the art that for an induction motor, $$L_r = L_m + L_{lr}, \tag{8}$$

where $L_{lr}$ is leakage inductance of the rotor of the motor. Substituting Equation (8) into Equation (7), the "torque per ampere" function becomes:

$$\frac{T}{\hat{I}} = \frac{3P}{4\hat{I}} \frac{L_m^2}{L_m + L_{lr}} i_d \sqrt{\hat{I}^2 - i_d^2}. \tag{9}$$

To find the maximum of this function (i.e., the maximum torque produced per ampere), we take the derivative of Equation (9) and set it to zero. Therefore, $$\frac{d}{di_d} \left[ \frac{L_m^2}{L_m + L_{lr}} i_d \sqrt{\hat{I}^2 - i_d^2} \right] = 0. \tag{10}$$

(As we are interested in finding the maximum torque for a given amount of current, $\hat{I}$ is treated as constant for the remainder of this derivation). Applying the Product Rule of differentiation, we find that:

$$\frac{d}{di_d} \left[ \frac{L_m^2}{L_m + L_{lr}} \right] i_d \sqrt{\hat{I}^2 - i_d^2} + \frac{d}{di_d} [i_d \sqrt{\hat{I}^2 - i_d^2}] \frac{L_m^2}{L_m + L_{lr}} = 0. \tag{10}$$

Performing the two differentiations on the left side of Equation (11) and simplifying leads to the conclusion that:

$$\left[ \frac{\frac{dL_m}{di_d}(L_m+2L_{lr})}{(L_m+L_{lr})} i_d + L_m \right] i_q^2 = L_m i_d^2. \quad (12)$$

Equation (13) embodies the peak-torque-per-ampere (PTPA) relationship between $i_q$ and $i_d$. Equation (13) can also be solved for $i_q$, with the following result:

$$i_q = \sqrt{\frac{L_m i_d^2}{\frac{\frac{dL_m}{di_d}(L_m+2L_{lr})}{(L_m+L_{lr})} i_d + L_m}} . \quad (13)$$

A further approximation can yield simpler equations than Equation (12) and Equation (13). Recall that $$L_r = L_m + L_{lr}. \quad (8)$$

Generally in an induction motor, $$L_m \gg L_{lr},$$

so it is a good approximation to assume that $$L_m + L_{lr} \approx L_m \quad (14)$$

and $$L_m + 2L_{lr} \approx L_m. \quad (15)$$

Substituting Equations (14) and (15) into Equation (12) leads to the result:

$$\left[ \frac{dL_m}{di_d} i_d + L_m \right] i_q^2 = L_m i_d^2. \quad (16)$$

Equation (16) embodies the peak-torque-per ampere relationship between $i_q$ and $i_d$ when the approximations of Equations (14) and (15) are employed. Further, Equation (16) can be solved for $i_q$, leading to the result:

$$i_q = \sqrt{\frac{L_m i_d^2}{\frac{dL_m}{di_d} i_d + L_m}} . \quad (17)$$

Either Equation (12) or Equation (16) can represent the relationship between $i_q^*$ and $i_d^*$ embodied in block 34. Equation (12) is somewhat more accurate, although Equation (16) is simpler.

It should be noted that $L_m$ as a function of $i_d$ is known for a given motor, so $L_m$ and the derivative of $L_m$ with respect to $i_d$ (components of Equations (12) and (16)) are known for any value of $i_d$. It is therefore seen that the relationship between $i_q^*$ and $i_d^*$ in Equations (12) and (16) can be calculated a priori using Equations (13) and (17), respectively, for a given motor and can be implemented in a look-up table. Of course, the relationships in Equations (12) and (16) can also be computed in "real time" as motor 22 is being controlled, though this will entail significant computing power. Piecewise linear approximations can be used as appropriate to help reduce the computing burden of the real-time computation or to reduce the complexity of the look-up table.

Figure 4:
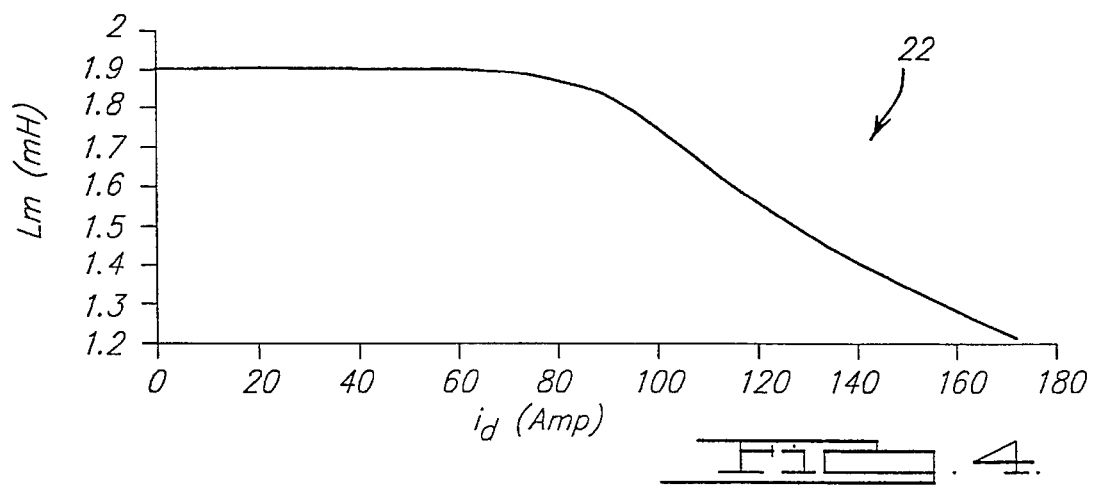
FIG. 4 is a graph of the relationship between magnetizing inductance and direct-axis current for a typical induction motor.
Figure 5:
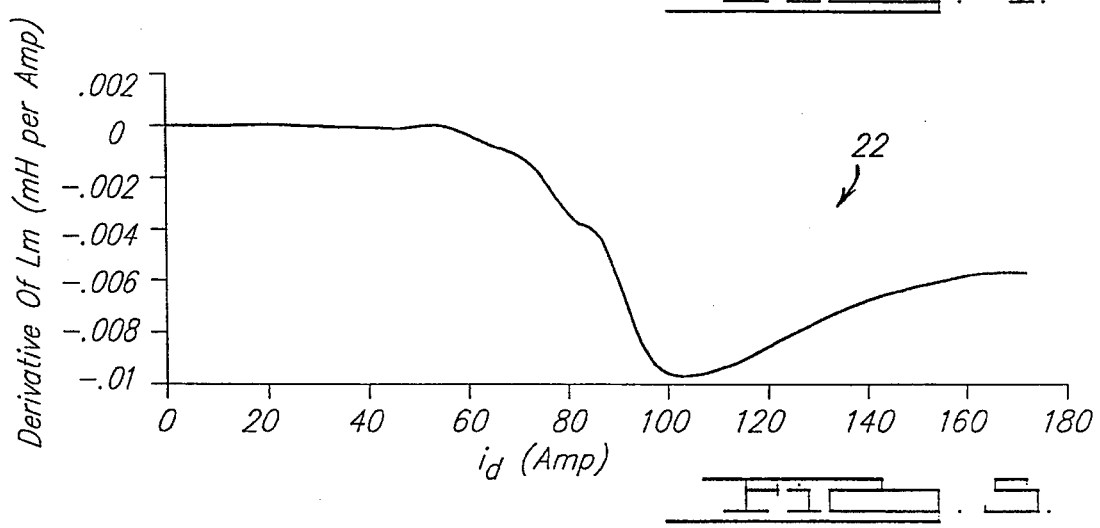
FIG. 5 is a graph of the derivative of the function illustrated in FIG. 4.
Figure 6:
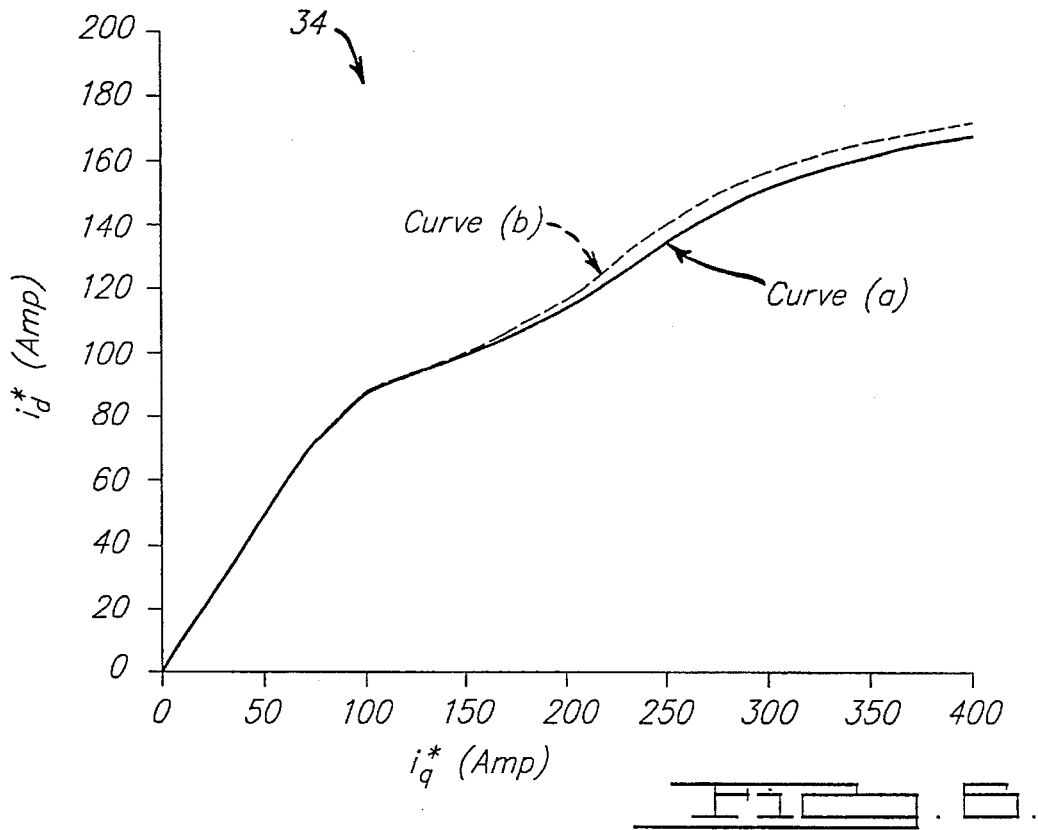
FIG. 6 shows graphs of relationships between desired direct-axis current and desired quadrature-axis current according to the present invention.

As an example, FIG. 4 shows the relationship between $L_m$ and $i_d$ for a typical induction motor. FIG. 5 shows the derivative of $L_m$ with respect to $i_d$ for the relationship of FIG. 4. FIG. 6 then shows two relationships between $i_q^*$ and $i_d^*$. Curve (a) in FIG. 6 shows the peak-torque-per-ampere relationship between $i_q^*$ and $i_d^*$ described by Equations (12) and (13). Curve (b) in FIG. 6 shows the peak-torque-per-ampere relationship between $i_q^*$ and $i_d^*$ described by Equations (16) and (17). It should be noted that curves (a) and (b) track closely together, confirming that the simplicity provided by Equation (16) over Equation (12) comes with relatively little loss in accuracy.

Once $i_d^*$ has been determined at block 34, it is fed to block 36. The output of block 36 is fed to summation block 37 and then divided by $T_r$ at block 38. The output of block 38 is then integrated with respect to time at block 40. The output of block 40, desired rotor flux $\lambda_r^*$, is fed back to summation block 37 and as the denominator to division block 32.

That the output of block 40 is indeed $\lambda_r^*$ is seen as follows. In a field-oriented induction motor, $i_d$ is known to be related to $\lambda_r$ by the following formula:

$$i_d = \frac{1}{L_m} \left[ T_r \frac{d\lambda_r}{dt} + \lambda_r \right], \quad (18)$$

where $T_r$ is the time constant of the rotor of the motor. Rearranging Equation (18), we see that:

$$L_m i_d = T_r \frac{d\lambda_r}{dt} + \lambda_r. \quad (19)$$

Integrating both sides of Equation (19) with respect to time and solving for $\lambda_r$, we reach the following result:

$$\lambda_r = \frac{\int (L_m i_d - \lambda_r) dt}{T_r} . \quad (20)$$

Blocks 36, 37, 38 and 40 carry out the computation of $\lambda_r^*$ as per the result shown in Equation (20).

After being output from block 40, $\lambda_r^*$ is input as the denominator into division block 42. The numerator going into division block 42 is $i_q^*$. The output of block 42 is multiplied by $L_m/T_r$ at block 44. The resulting output from block 44 is $\omega_s^*$, the desired slip speed of motor 22. Slip speed is defined as the desired difference in rotational speed between the rotor of motor 22 and the electromagnetic field produced in the stator of motor 22. In an induction motor, the rotor rotates more slowly than the electromagnetic field in the stator.

That the output of block 44 is in fact $\omega_s^*$ is seen by the fact that for field-orientation of an induction motor, $$\omega_s = \frac{L_m}{T_r} \frac{i_q}{\lambda_r} . \quad (22)$$

Indeed, Equation (22) is a fundamental relationship for field orientation, because it guarantees that rotor flux along the quadrature axis is zero. Equation (22) is implemented by blocks 42 and 44.

$i_q^*$, $i_d^*$ and $\omega_s^*$ are inputs to block 46 of motor controller 24. Block 46 performs current control and generation of switching signals for inverter 14. Such operations as a part of field-oriented control of induction motors are well-known in the art of induction motor control. Outputs of block 46 are the switching signals 26 for inverter 14 (see also FIG. 1).

At the output of block 34, $i_d^*$ is also fed to a parameter generation block 48. The outputs of parameter generation block 48 are $L_m$, $L_r$ and $T_r$, which are used in various places in FIG. 2. As has been discussed, these three parameters are all functions of $i_d$. Furthermore, the functions are all known a priori for a given motor. Therefore, parameter generation block 48 preferably contains look-up tables embodying the relationships between $L_m$ and $i_d$, between $L_r$ and $i_d$, and between $T_r$ and $i_d$. Of course, instead of employing look-up tables to generate $L_m$, $L_r$ and $T_r$, parameter generation block 48 can also calculate those three parameters from the known relationship between them and $i_d$ for any given motor.

Control of motor 22 by motor controller 24 allows motor 22 to produce the commanded torque T* with a minimum of motor current. Such a condition of minimum current implies that motor 22 is operating at high efficiency.

Figure 3:
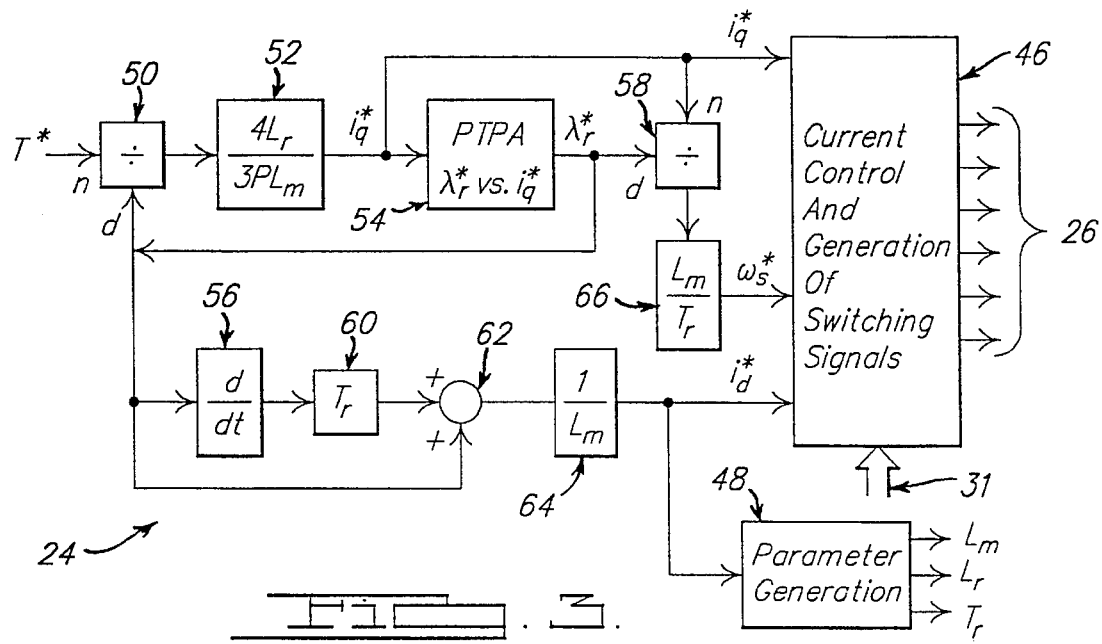
FIG. 3 is a block diagram of a second embodiment of motor controller 24 of FIG. 1.

A second embodiment of the present invention is illustrated in FIG. 3. Here, T* is again input to the motor controller, designated as reference numeral 24' in FIG. 3. At block 50, T* is divided by $\lambda_r^*$ and the result is multiplied by $$\frac{4}{3} \frac{L_r}{PL_m}$$

at block 52. The result from block 52 is $i_q^*$. That this is in fact true is seen from the equation for torque of a field-oriented induction motor:

$$T = \frac{3P}{4} \frac{L_m}{L_r} i_q \lambda_r. \tag{1}$$

Solving for $i_q$ leads to:

$$i_q = \frac{4}{3P} \frac{L_r}{L_m} \frac{T}{\lambda_r}. \tag{23}$$

Computation of the right side of Equation (23) is performed at blocks 50 and 52. At block 54, $\lambda_r^*$ is generated from $i_q^*$. Block 54 embodies the previously-derived relationship between $i_d$ and $i_q$, $$\left[ \frac{\frac{dL_m}{di_d}(L_m + 2L_{1r})}{(L_m + L_{1r})} i_d + L_m \right] i_q^2 = L_m i_d^2 \tag{12}$$

or the simpler approximation $$\left[ \frac{dL_m}{di_d} i_d + L_m \right] i_q^2 = L_m i_d^2, \tag{16}$$

as well as the relationship $$\lambda_r = L_m i_d. \tag{2}$$

Preferably the relationship between $\lambda_r^*$ and $i_q^*$ in Equation (2) and either Equation (12) or Equation (16) is stored in a look-up table, using Equation (2) and either Equation (13) or Equation (17). Of course, the relationship between $\lambda_r^*$ and $i_q^*$ can also be computed in real time, using Equation (2) and either Equation (12) or Equation (16). Piecewise linear approximations can be used as necessary to reduce the computing burden of the real-time computation or to reduce the complexity of the look-up table.

Figure 7:
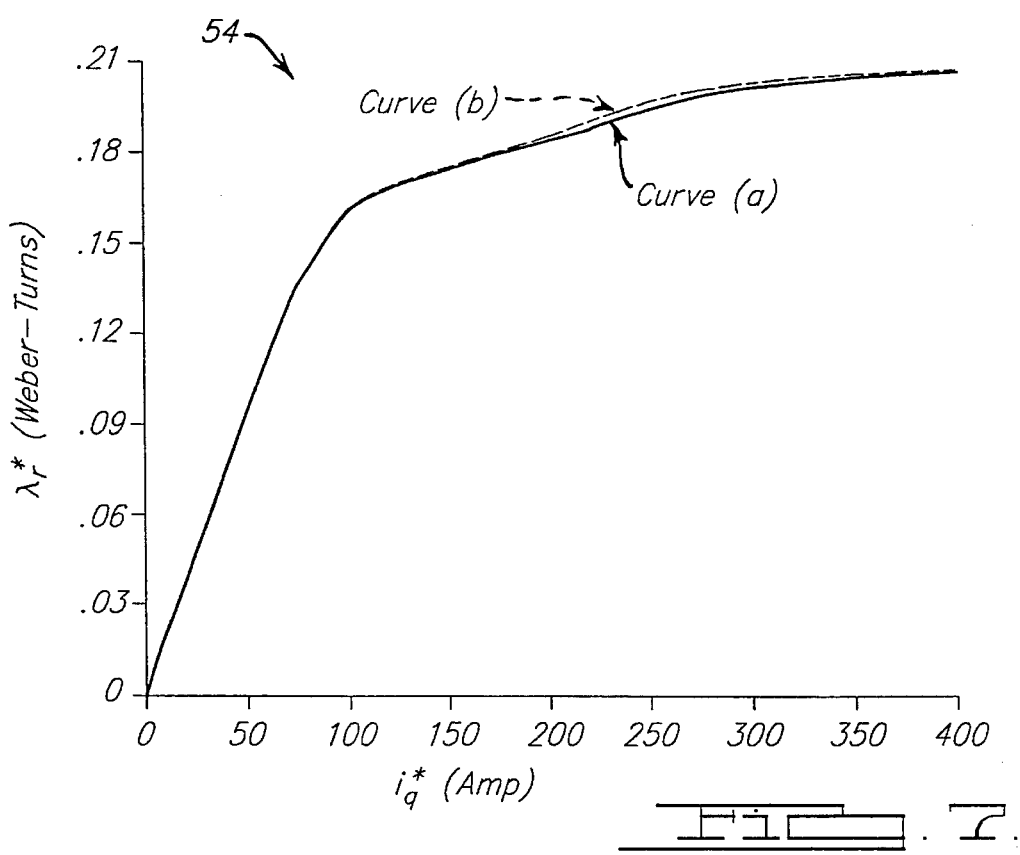
FIG. 7 shows graphs of relationships between desired rotor flux and desired quadrature-axis current according to the present invention.

As an illustration of the peak-torque-per-ampere relationship between $i_q^*$ and $\lambda_r^*$, consider again a motor with the $L_m$ versus $i_d$ relationship illustrated in FIG. 4 and the derivative of $L_m$ versus $i_d$ relationship illustrated in FIG. 5. FIG. 7 shows two relationships between $\lambda_r^*$ and $i_q^*$. Curve (a) shows $\lambda_r^*$ versus $i_q^*$ according to the present invention where the relationships of Equation (2) and Equation (12) are applied. Curve (b) shows $\lambda_r^*$ versus $i_q^*$ where Equation (2) and the simplification embodied by Equation (16) are employed. The similarity of curves (a) and (b) illustrate that little accuracy is lost in employing simplified Equation (16) as opposed to employing the more complicated (though more strictly accurate) Equation (12).

At the output of block 54, $\lambda_r^*$ is fed back to block 50 and fed to blocks 56 and 58. At block 56, $\lambda_r^*$ is differentiated with respect to time and the result is multiplied by $T_r$ at block 60. The result from block 60 is added to $\lambda_r^*$ at block 62 and the result is multiplied by $1/L_m$ at block 64. The result of block 64 is $i_d^*$. That this is true is seen because it has previously been noted that $$i_d = \frac{1}{L_m} \left[ T_r \frac{d\lambda_r}{dt} + \lambda_r \right]. \tag{18}$$

Blocks 56, 60, 62 and 64 perform the operations on the right side of Equation (18). At block 58, $i_q^*$ is divided by $\lambda_r^*$. The result is multiplied at block 66 by $L_m/T_r$ to produce $\omega_s^*$. Blocks 58 and 66 therefore perform the operation given by the equation $$\omega_s = \frac{L_m}{T_r} \frac{i_q}{\lambda_r}. \tag{22}$$

$i_q^*$, $i_d^*$ and $\omega_s^*$ are fed into block 46. As previously described, the outputs of block 46 are the switching signals 26 to inverter 14 (see also FIG. 1).

$i_d^*$ as the output of block 64 is also fed into parameter generation block 48. As previously described in relation to FIG. 2, the outputs of parameter generation block 48 are motor parameters $L_m$, $L_r$ and $T_r$. These motor parameters are used in various places in FIG. 3.

Various modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for field-oriented control of an induction motor, said method comprising the steps of:

choosing a desired quadrature-axis current $i_q^*$; and choosing a desired direct-axis current $i_d^*$ as a function of said desired quadrature-axis current $i_q^*$ and of a magnetizing inductance of said induction motor;

wherein said desired quadrature-axis current $i_q^*$ and said desired direct-axis current $i_d^*$ are related by the following relationship:

$$\left[ \frac{\frac{dL_m}{di_d^*}(L_m + 2 L_{lr})}{(L_m + L_{lr})} i_d^* + L_m \right] i_q^{*2} = L_m i_d^{*2},$$

where $L_m$ is said magnetizing inductance of said induction motor and $L_{lr}$ is a leakage inductance of the rotor of said induction motor.

2. A method for field-oriented control of an induction motor as recited in claim 1 further comprising the step of providing a look-up table embodying said relationship.

3. A method for field-oriented control of an induction motor, said method comprising the steps of:

choosing a desired quadrature-axis current $i_q^*$; and choosing a desired direct-axis current $i_d^*$ as a function of said desired quadrature-axis current $i_q^*$ and of a magnetizing inductance of said induction motor;

wherein said desired quadrature-axis current $i_q^*$ and said desired direct-axis current $i_d^*$ are related by the following relationship:

$$\left[ \frac{dL_m}{di_d^*} i_d^* + L_m \right] i_q^{*2} = L_m i_d^{*2},$$

where $L_m$ is said magnetizing inductance of said induction motor.

4. A method for field-oriented control of an induction motor as recited in claim 3 further comprising the step of providing a look-up table embodying said relationship.

5. A method for field-oriented control of an induction motor, said method comprising the steps of:

choosing a desired quadrature-axis current $i_q^*$; and choosing a desired rotor flux $l_r^*$ as a function of said desired quadrature-axis current $i_q^*$ and of a magnetizing inductance of said induction motor;

wherein said desired quadrature-axis current $i_q^*$ and said desired rotor flux $l_r^*$ are related by the following relationships:

$$\left[ \frac{\frac{dL_m}{di_d^*}(L_m + 2L_{lr})}{(L_m + L_{lr})} i_d^* + L_m \right] i_q^{*2} = L_m i_d^{*2}$$

and $$\lambda_r^* = L_m i_d^*,$$

where $i_d^*$ is a desired direct-axis current of said induction motor, $L_m$ is said magnetizing inductance of said induction motor and $L_{lr}$ is a leakage inductance of the rotor of said induction motor.

6. A method for field-oriented control of an induction motor as recited in claim 5 further comprising the step of providing a look-up table embodying said relationships.

7. A method for field-oriented control of an induction motor, said method comprising the steps of:

choosing a desired quadrature-axis current $i_q^*$; and choosing a desired rotor flux $l_r^*$ as a function of said desired quadrature-axis current $i_q^*$ and of a magnetizing inductance of said induction motor wherein said desired quadrature-axis current $i_q^*$ and said desired rotor flux $l_r^*$ are related by the following relationships:

$$\left[ \frac{dL_m}{di_d^*} i_d^* + L_m \right] i_q^{*2} = L_m i_d^{*2}$$

and $$\lambda_r^* = L_m i_d^*,$$

where $L_m$ is said magnetizing inductance of said induction motor and $i_d^*$ is a desired direct-axis current of said induction motor.

8. A method for field-oriented control of an induction motor as recited in claim 7 further comprising the step of providing a look-up table embodying said relationships.

9. A field-oriented control apparatus for an induction motor, said apparatus comprising:

means for choosing a desired quadrature-axis current $i_q^*$; and means for choosing a desired direct-axis current $i_d^*$; wherein said desired direct-axis current $i_d^*$ is a function of said desired quadrature-axis current $i_q^*$ and a magnetizing inductance of said motor; and wherein said desired quadrature-axis current $i_q^*$ and said desired direct-axis current $i_d^*$ are related by the following relationship:

$$\left[ \frac{\frac{dL_m}{di_d^*}(L_m + 2L_{lr})}{(L_m + L_{lr})} i_d^* + L_m \right] i_q^{*2} = L_m i_d^{*2},$$

where $L_m$ is said magnetizing inductance of said induction motor and $L_{lr}$ is a leakage inductance of the rotor of said induction motor.

10. A field-oriented control apparatus for an induction motor as recited in claim 9, wherein said means for choosing a direct-axis current $i_d^*$ comprises a look-up table embodying said relationship.

11. A field-oriented control apparatus for an induction motor as recited in claim 9, wherein said means for choosing a quadrature-axis current $i_q^*$ comprises a look-up table embodying said relationship.

12. A field-oriented control apparatus for an induction motor, said apparatus comprising:

means for choosing a desired quadrature-axis current $i_q^*$; and means for choosing a desired direct-axis current $i_d^*$; wherein said desired direct-axis current $i_d^*$ is a function of said desired quadrature-axis current $i_q^*$ and a magnetizing inductance of said motor; and wherein said desired quadrature-axis current $i_q^*$ and said desired direct-axis current $i_d^*$ are related by the following relationship:

$$\left[ \frac{dL_m}{di_d^*} i_d^* + L_m \right] i_q^{*2} = L_m i_d^{*2},$$

where $L_m$ is said magnetizing inductance of said induction motor.

13. A field-oriented control apparatus for an induction motor as recited in claim 12, wherein said means for choosing a desired direct-axis current $i_d^*$ comprises a look-up table embodying said relationship.

14. A field-oriented control apparatus for an induction motor as recited in claim 12, wherein said means for choosing a desired quadrature-axis current $i_q^*$ comprises a look-up table embodying said relationship.

\* \* \* \* \*